(12) United States Patent
Ichioka

(10) Patent No.: US 6,510,973 B1
(45) Date of Patent: Jan. 28, 2003

(54) COIN CASE FOR AUTOMOBILE

(75) Inventor: Hiroaki Ichioka, Yokohama (JP)

(73) Assignee: Piolax, Inc., Kanagawa-Ken (JP)

( * ) Notice: Subject to any disclaimer, the term of this patent is extended or adjusted under 35 U.S.C. 154(b) by 0 days.

(21) Appl. No.: 09/436,352

(22) Filed: Nov. 9, 1999

(30) Foreign Application Priority Data

Nov. 10, 1998 (JP) ......................................... P10-318481

(51) Int. Cl.⁷ ................................................ B60R 7/06
(52) U.S. Cl. ...................... 224/483; 224/275; 224/540; 224/544; 206/0.83; 206/0.84; 248/311.2; 296/37.8; 296/37.12; 453/52; 453/54; 99/34
(58) Field of Search .............................. 224/483, 275, 224/540, 544; 206/0.83, 0.84, 0.8; 296/37.8, 37.12; 453/52, 54; 248/311.2; 99/34

(56) References Cited

U.S. PATENT DOCUMENTS

| | | | |
|---|---|---|---|
| 189,956 A | * 4/1877 | Read | 453/54 X |
| 205,967 A | * 7/1878 | Leach | 453/54 X |
| D23,522 S | * 7/1894 | Low | 453/54 X |
| D44,466 S | * 8/1913 | Brunhoff | D99/34 X |
| D44,836 S | * 11/1913 | Brunhoff | D99/34 X |
| 4,568,117 A | * 2/1986 | McElfish et al. | 296/37.8 |
| 5,085,481 A | * 2/1992 | Fluharty et al. | 296/37.8 |
| 5,441,448 A | * 8/1995 | Yang | 453/60 |
| 5,601,268 A | * 2/1997 | Dunchock | 248/311.2 |
| 5,720,514 A | * 2/1998 | Carlsen et al. | 297/188.1 |
| 5,730,491 A | * 3/1998 | Carlsen et al. | 297/188.19 |
| 5,749,629 A | * 5/1998 | Heath et al. | 297/411.36 |

FOREIGN PATENT DOCUMENTS

JP 08183403 7/1996

* cited by examiner

Primary Examiner—Stephen K. Cronin
(74) Attorney, Agent, or Firm—Howard & Howard

(57) ABSTRACT

A coin case for an automobile includes: a casing to be attached to a vehicle end, the casing being formed with a plurality of independent cylindrical chambers to be sortingly loaded with a plural kind of coins; and a coin tray connected to a side end portion of the casing, the coin tray including a bottom wall having a curved surface in a direction toward the plurality of independent cylindrical chambers from a place where is far from the coin case.

9 Claims, 3 Drawing Sheets

COIN CASE FOR AUTOMOBILE

BACKGROUND OF THE INVENTION

1. Field of the Invention

The present invention relates to a coin case for an automobile, more particularly relates to a coin case for an automobile which is to be mounted on an upper surface of an instrument panel of an automobile.

2. Description of the Related Art

A general coin case for an automobile is known as the structure shown in a Official Gazette for Japanese Patent Application Laid Open No.8-183403. As shown in figures, especially in FIG. 8 of the Official Gazette, the general coin case for an automobile is developed so as to be inserted into a slot of a cassette player or disc player mounted to the automobile into which a recording tape cassette or recording disc is inserted. The general coin case for an automobile includes: a casing formed with a plurality of independent cylindrical chambers to be sortingly loaded with a plural kind of coins; a plurality of springs inserted into the cylindrical chambers respectively; and a plurality of caps inserted into the cylindrical chambers and on the springs respectively. In the construction, each of the cap pushes up the loaded coins in the cylindrical chamber toward an opening end of the cylindrical chamber by a biasing force from the spring.

Accordingly, when the coins are required to be unloaded from the coin case, an original uppermost coin among the piled coins in the cylindrical chamber is drawn out from the opening so that the second piled coin becomes a continuous uppermost coin. By replaying the operation stated above, the piled coins are continuously drawn out from the opening, so that the plurality of the piled coins can be unloaded from the coin case.

On the contrary, when the coins are required to be loaded into the coin case, a coin to be loaded is inserted into the opening in such a manner that the coin pushes down the cap against the biasing force of the spring so as to be sandwiched by the cap and a stopping lip formed above the opening of the casing. In this manner, coins to be loaded are sortingly loaded into each of the cylindrical chambers of the coin case.

However, since a place where coins are temporally located is not provided in the general coin case, required numbers of coins belong to required plural kinds can not previously prepared. Therefore, the general coin case is not convenient for use to pay fees at a toll gate in a highway. In addition, coins of change from the toll gate should be directly loaded into the general coin case because the place where coins of change are temporally located is not provided in the general coin case. In this connection, the general coin case is not also convenient for receiving the coins of change at a toll gate in a highway.

SUMMARY OF THE INVENTION

The present invention has been achieved with such points in mind.

According to a first aspect of the present invention, there is provided a coin case for an automobile comprising: a casing to be attached to a vehicle end, the casing being formed with a plurality of independent cylindrical chambers to be sortingly loaded with a plural kind of coins; and a coin tray connected to a side end portion of the casing, the coin tray including a bottom wall having a curved surface in a direction toward the plurality of independent cylindrical chambers from a place where is far from the coin case.

According to a second aspect of the present invention, as it depends from the first aspect, there is provided a coin case for an automobile further comprising: a plurality of springs inserted into the cylindrical chambers respectively; and a plurality of caps inserted into the cylindrical chambers and on the springs respectively, wherein each of the cap pushes up the loaded coins in the cylindrical chamber toward an opening end of the cylindrical chamber by a biasing force from the spring.

In the coin case for an automobile according to the first and second aspect of the present invention, since the coin tray is connected to the side end portion of the casing of the coin case, coins which are required to be paid can be temporally located on the coin tray after the coins are previously unloaded from the cylindrical chambers of the coin case and fallen down on the coin tray, prior to the payment of fees for a highway at a toll gate in the highway. In this connection, when a payer boarding on the automobile arrived at the toll gate, the payer can pay the fees smoothly without counting the number of the coins, thereby shortening the time to stay at the toll gate for the payment of the fees.

In addition, coins of change from the toll gate can also be temporally located on the coin tray after the payment of fees has been finished. The payer will be able to load the coins of change in such a manner that the coins of change are sortingly loaded into each of the cylindrical chambers of the coin case later, for example, during waiting a traffic signal, thereby further shortening the time to stay at the toll gate for the payment of the fees.

Furthermore, the payer can load the coins of change one by one in a manner such that the payer slides the coin on an upper surface of the curved bottom wall of the casing toward an opening end of the cylindrical chamber of the coin case with pushing the coin onto the upper surface of the curved bottom wall by only one finger, without picking up the coin from the upper surface of the curved bottom wall, thereby facilitating operations of loading coins of change into the coin case.

According to a third aspect of the present invention, as it depends from the first aspect, there is provided a coin case for an automobile further comprising: a lid swingably mounted to the casing so as to cover.the coin tray.

In the coin case for an automobile according to the third of the present invention, during the lid is shut so as to cover the coin tray, coins temporally located on the coin tray are prevented from dropping out of the coin tray even when the automobile is stopped with an emergency brake, thereby improving stocking status of the temporally located coins on the coin tray.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
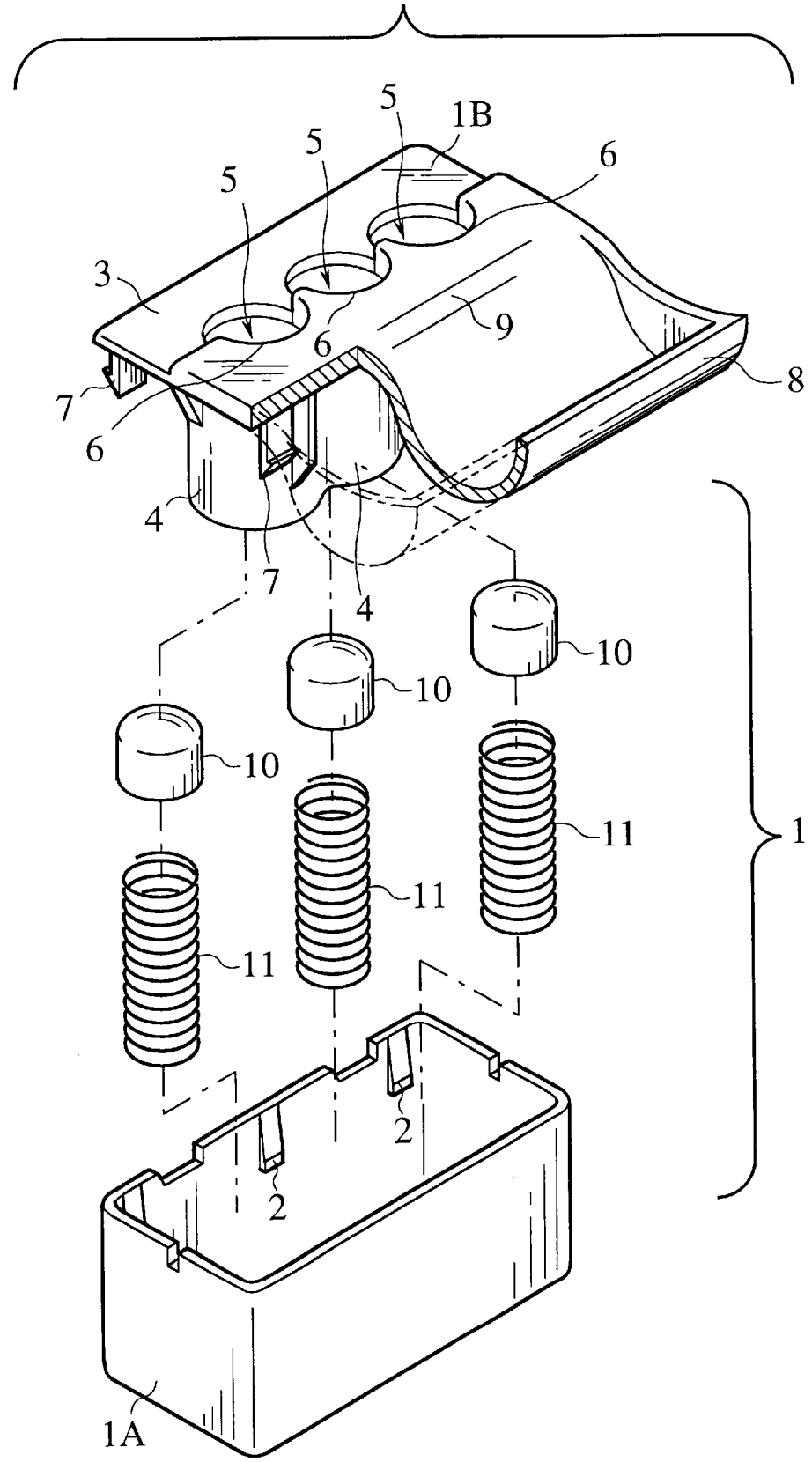
FIG. 1 is an exploded perspective view of a coin case according to the present invention for a first embodiment and a coin tray of the coin case is partially omitted.

There will be detailed below the preferred embodiments of the present invention with reference to the accompanying drawings. Like members are designated by like reference characters.

Referring now to FIG. 1, a coin case for an automobile according to the present invention for a first appropriate embodiment will be explained in detail hereinafter. The coin case 1 includes: a casing constructed by an outer case portion 1A and an inner case portion 1B. The outer case portion 1A is box-shaped and has a plurality of convex portions 2. The inner case portion 1B has a plurality of protruding nails 7 which are to connect with the convex portions 2 so that the inner case portion 1B is fixed to the outer case portion 1A.

The inner case portion 1B further includes an upper wall 3; a plurality of independent cylindrical chambers 5 to be sortingly loaded with a plural kind of coins; a plurality of arc-shaped stopping lips 6; and a concave-shaped coin tray 8 connected to a side end portion of the upper wall 3. The upper wall 3 is formed with a plurality of independent cylindrical portions 4 which protrude vertically from the lower surface of the upper wall 3 in series. The independent cylindrical chambers 5 are formed in the cylindrical portions 4 respectively as through holes. The plurality of arc-shaped stopping lips 6 are formed on the upper surface of the upper wall 3 above upper opening end portions of the cylindrical chambers 5. Each of the arc-shaped stopping lips 6 stops and refrains the coins from coming out of the respective cylindrical chamber 5 together with a cap 10 which is described in detail hereinbelow.

Here, the coin tray 8 has a curved bottom wall curved in a direction toward the plurality of independent cylindrical chambers 5 from a place where is far from the coin case, namely far from the cylindrical chambers 5. A portion between the curved bottom wall of the coin tray 8 and the side end portion of the upper wall 3, is another curved surface 9 of which the radius is smaller than that of the curved surface of the curved bottom wall of the coin tray 8.

Figure 2:
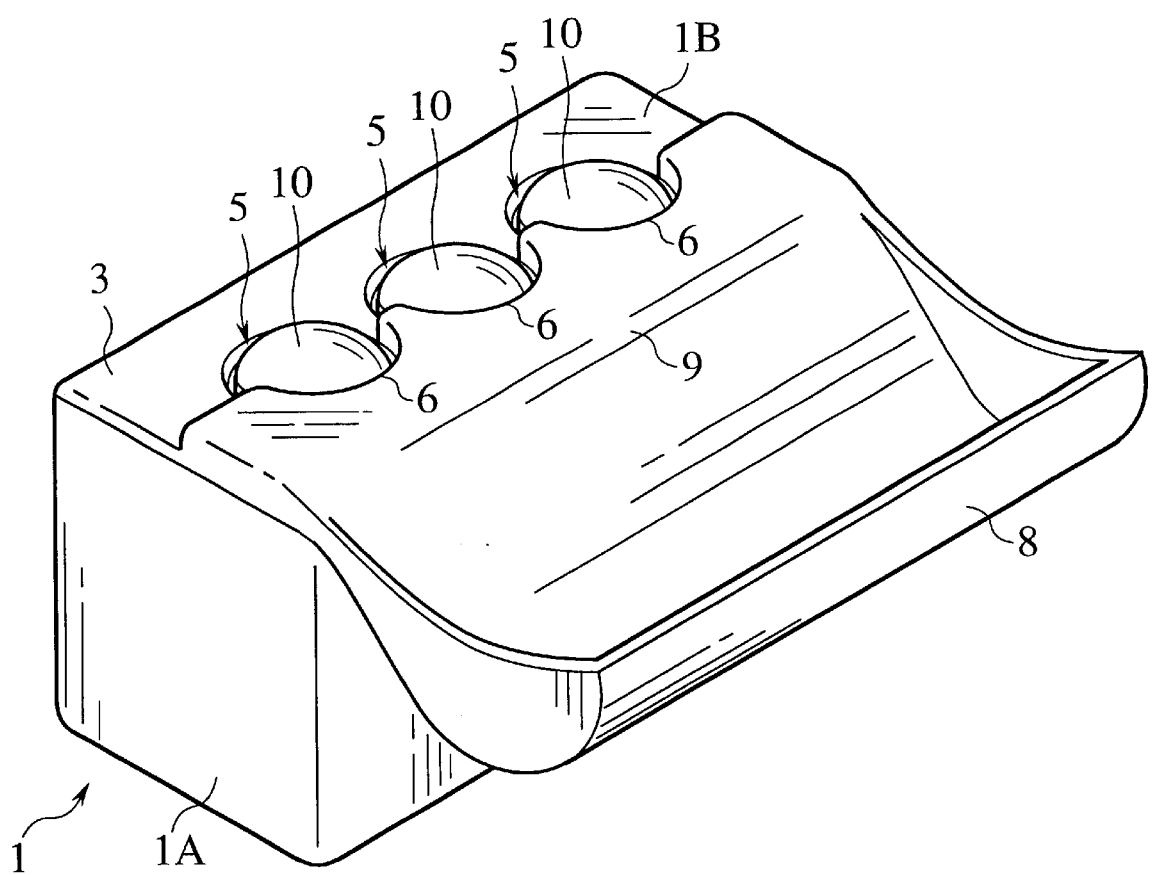
FIG. 2 is a perspective view of a coin case according to the present invention in a state that the coin case is assembled.

In addition to the construction stated above, for assembling the coin case for an automobile according to the first embodiment, caps 10 and coil-typed springs 11 are inserted into the respective cylindrical chambers 5 from lower opening ends of the cylindrical chambers 5. In this state, the inner case portion 1B is brought to be fixed to the outer case portion 1A in such a manner that the plurality of protruding nails 7 of the inner case portion 1B are brought to be connected with the convex portions 2 of the outer case portion 1A. According to the construction described above, as shown in FIG. 2, the caps 6 are sandwiched by the stopping lips 6 and the springs 11 which are urging and pushing up the caps 10 upwardly, so that the caps 10 are not ejected from the upper opening ends of the cylindrical chambers 5.

According to the construction, after the coin case is mounted on an upper surface of an instrument panel of the automobile by, for example, a adhering tape which is adhered on both surfaces thereof, a coin is inserted into the upper opening ends of the cylindrical chambers 5 so as to press the coil spring through the cap 10, so that the coin is sandwiched by the stopping lip 6 and the cap 10. By repeating this operation, a plural kind of coins are sortingly loaded into the plurality of independent cylindrical chambers 5 which are constructed by a plural sizes of diameters appropriately corresponding to diameters of a plural kind of coins to be loaded thereinto.

Therefore, since the coin tray 8 is connected to the side end portion of the casing of the coin case, coins which are required to be paid can be temporally located on the coin tray 8 after the coins are previously unloaded from the cylindrical chambers 5 of the coin case and fallen down on the coin tray 8, prior to the payment of fees for a highway at a toll gate in the highway. In this connection, when a payer boarding on the automobile arrived at the toll gate, the payer can pay the fees smoothly without counting the number of the coins, thereby shortening the time to stay at the toll gate for the payment of the fees.

In addition, coins of change from the toll gate can also be temporally located on the coin tray 8 after the payment of fees has been finished. The payer will be able to load the coins of change in such a manner that the coins of change are sortingly loaded into each of the cylindrical chambers 5 of the coin case later, for example, during waiting a traffic signal, thereby further shortening the time to stay at the toll gate for the payment of the fees.

Furthermore, the payer can load the coins of change one by one in a manner such that the payer slides the coin on the upper surface of the curved bottom wall of the coin tray 8 toward the opening end of the cylindrical chamber 5 of the coin case with pushing the coin onto the upper surface of the curved bottom wall by only one finger, without picking up the coin from the upper surface of the curved bottom wall, thereby facilitating operations of loading coins of change into the coin case.

Figure 3:
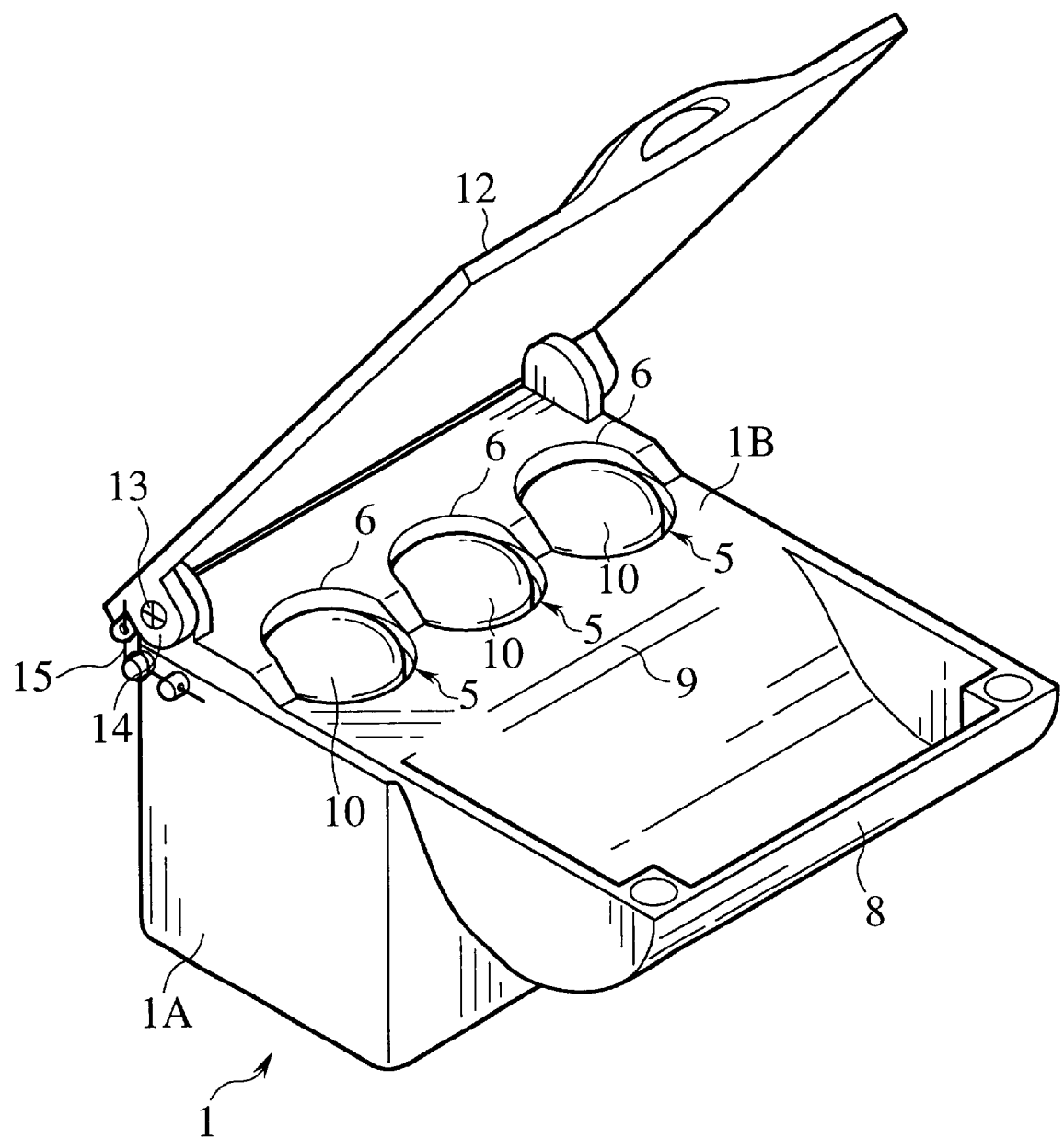
FIG. 3 is a perspective view of a coin case according to the present invention for a second embodiment in a state that the coin case is assembled.

Referring now to FIG. 3, a coin case for an automobile according to the present invention for a second appropriate embodiment will be explained hereinafter. The different points or improved point of the coin case according to the second embodiment from the coin case according to the first embodiment are as follows.

First, the coin case 1 according to this embodiment is provided with a lid 12 which is swingably mounted to an end of the inner case portion 1B at opposite end where the coin tray 8 is provided by means of pivots 13, bearing portions and twist-typed spring 15 as shown in FIG. 3. According to the spring 15, the lid 12 is clicked and stopped at positions where the lid 12 is opened and closed.

Second point is that each of the arc-shaped stopping lips 6 according to this embodiment is located an end of the upper opening end of the cylindrical chamber 5 at the opposite end where the coin tray 8 is provided. On the contrary, each of the arc-shaped stopping lips 6 according to the first embodiment is located an end of the upper opening end of the cylindrical chamber 5 near to the coin tray 8, thereby locating the stopping lips 6 between the cylindrical chamber 5 and the coin tray 8.

Therefore, according to the second embodiment, coins which are required to be paid can be also temporally located on the coin tray 8 after the coins are previously unloaded from the cylindrical chambers 5 of the coin case and fallen down on the coin tray 8 prior to the payment. In this connection, the time to stay at the toll gate for the payment can be shortened.

In addition, since coins of change can also be temporally located on the coin tray 8, the coins of change are sortingly loaded into each of the cylindrical chambers 5 of the coin case later, for example, during waiting a traffic signal, thereby further shortening the time to stay at the toll gate for the payment of the fees.

Furthermore, during the lid 12 is shut so as to cover the coin tray 8, coins temporally located on the coin tray 8 are prevented from dropping out of the coin tray 8 even when the automobile is stopped with an emergency brake, thereby improving stocking status of the temporally located coins on the coin tray 8. On the other hand, when coins are required to be loaded and unloaded into and from the coin case, the payer may open the lid 12.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. A coin holder for a vehicle, comprising:
   an upper wall having a plurality of cylindrical chambers; and
   a tray extending from the upper wall, the tray having a curved bottom surface and another curved surface that is located between the cylindrical chambers and the curved bottom surface,
   wherein the tray is formed with a plurality of arc-shaped stopping lips which are opened toward the upper wall; and
   wherein each of the plurality of arc-shaped stopping lips is located above one of the plurality of cylindrical chambers in a manner such that each of the plurality of arc-shaped stopping lips partially overlaps one of the cylindrical chambers thereby permitting a coin to be slid from the curved bottom surface toward the upper wall and then reversingly slid toward one of the arc-shaped stopping lips and inserted into one of the cylindrical chambers, wherein the arc-shaped stopping lip stops a coin from ejecting from the cylindrical chamber.

2. The coin holder for a vehicle according to claim 1, further comprising a lid hingably mounted to said casing to swingably cover said tray.

3. The coin holder for a vehicle according to claim 1, further comprising a cap slidably retained in each of said plurality of cylindrical chambers and a biasing member acting between each of said caps and said casing.

4. The coin holder for a vehicle according to claim 3, wherein said biasing member is a spring.

5. A coin holder for a vehicle, comprising:
   an upper wall having a plurality of cylindrical chambers;
   a cap slideably retained in each of the plurality of cylindrical chambers;
   a biasing member in each of the plurality of cylindrical chambers the biasing member biasing the cap unwardly; and
   a tray extending from the casing, the tray having a curved bottom surface and another curved surface that is located between the cylindrical chambers and the curved bottom surface;
   wherein the tray is formed with a plurality of arc-shaped stopping lips which are opened toward the upper wall; and
   wherein each of the plurality of arc-shaped stopping lips is located above one of the plurality of cylindrical chambers in a manner such that each of the plurality of arc-shaped stopping lips partially overlaps one of the cylindrical chambers thereby permitting a coin to be slid from the curved bottom surface toward the upper wall and then reversingly slid toward one of the arc-shaped stopping lips and inserted into one of the cylindrical chambers, wherein the arc-shaped stopping lip and the cap pinch the coin between them so as to stop the coin from ejecting from the cylindrical chamber.

6. The coin holder for a vehicle according to claim 3, further comprising a lid hingably mounted to said casing to swingably cover said tray.

7. The coin holder for a vehicle according to claim 5, wherein said lip is integral to said tray.

8. A coin holder for a vehicle, comprising:
   a casing having a plurality of cylindrical chambers;
   a cap slideably retained in each of the plurality of cylindrical chambers;
   a biasing member in each of the plurality of cylindrical chambers acting between each of the caps and the casing, the biasing member biasing the cap upwardly
   a tray extending from the casing, the tray having a curved bottom surface and another curved surface that is located between the cylindrical chambers and the curved bottom surface; and
   a plurality of arc-shaped stopping lips each of which is located above one of the plurality of cylindrical chambers and which are opened toward the tray;
   wherein each of the plurality of arc-shaped stopping lips partially overlaps one of the plurality of cylindrical chambers thereby permitting a coin to be directly slid from the curved bottom surface toward one of the arc-shaped stopping lips and directly inserted into one of the cylindrical chambers, wherein the arc-shaped stopping lip and the cap pinch the coin between them so as to stop the coin from ejecting from the cylindrical chamber.

9. A coin holder for a vehicle according to claim 8, further comprising;
   a lid hingeably mounted to said casing to swingably cover said tray.

* * * * *